G. W. ROSS.
Harrow.

No. 206,750.   Patented Aug. 6, 1878.

WITNESSES:
C. Neveux
C. Sedgwick

INVENTOR:
G. W. Ross
BY Munn & Co
ATTORNEYS.

UNITED STATES PATENT OFFICE.

GEORGE W. ROSS, OF NEWTON, WEST VIRGINIA.

IMPROVEMENT IN HARROWS.

Specification forming part of Letters Patent No. 206,750, dated August 6, 1878; application filed June 11, 1878.

*To all whom it may concern:*

Figure 1:
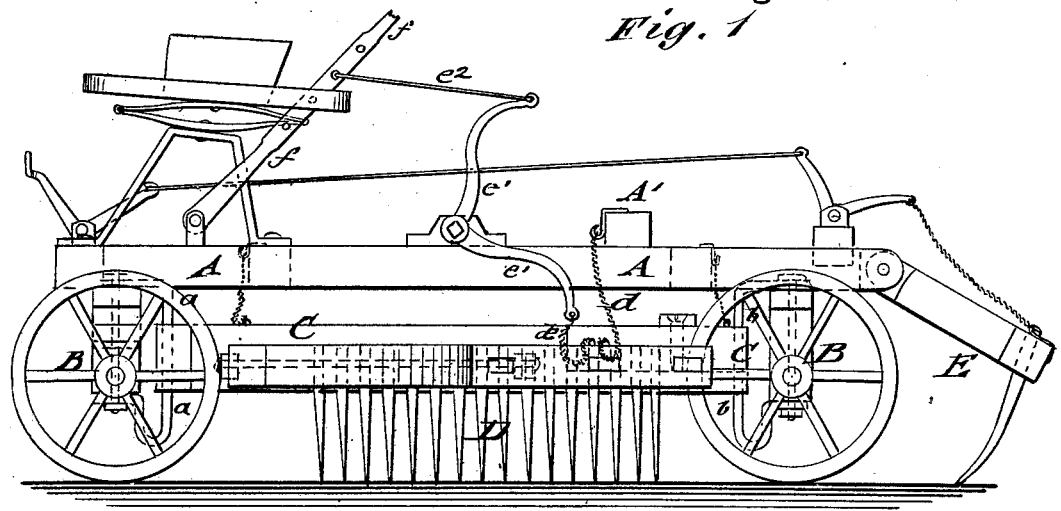
Figure 2:
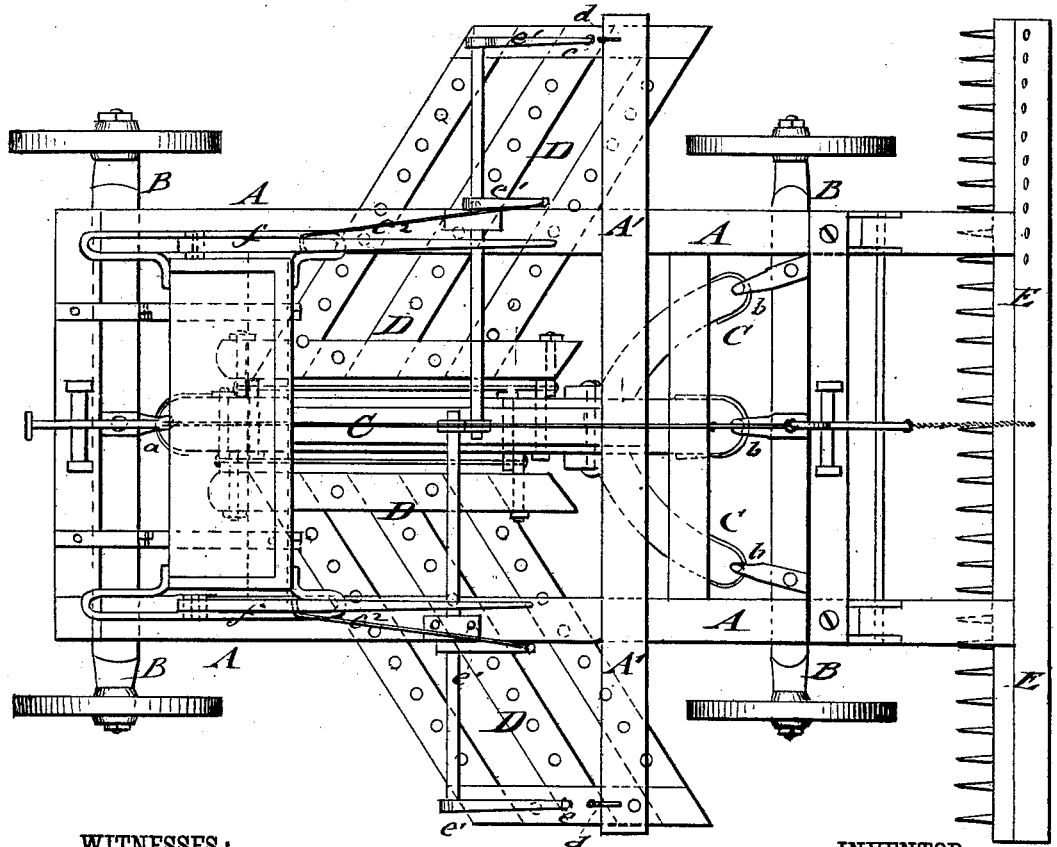

Be it known that I, GEORGE W. ROSS, of Newton, in the county of Roane and State of West Virginia, have invented a new and Improved Harrow, of which the following is a specification:

In the accompanying drawing, Figure 1 represents a side elevation, and Fig. 2 a top view, of my improved harrow.

Similar letters of reference indicate corresponding parts.

The object of this invention is to furnish an improved harrow that has the advantage that all its parts or sections may be conveniently raised or lowered from the driver's seat, so as to pass over obstructions without injury and delay, and which may also be easily moved from place to place without detaching any one of the working parts.

The invention consists of a harrow made of symmetrical sections, that are hinged to a central reach which extends from the front axle to the rear axle, and is suspended by chains from a supporting-frame, and guided vertically along guide-bolts of the axles.

The sections are raised or lowered by suitable lever-connection from the driver's seat, while a central lever or treadle operates a smoothing harrow or rake hung to the rear part of the supporting-frame.

Referring to the drawing, A represents a wheeled supporting-frame, at the front part of which the driver's seat is arranged.

The frame A is supported on bolsters of the front and rear axles B, which are connected by a central reach, C, that is suspended by chains and vertically movable along a fixed central guide-staple, $a$, of the front axle, and on fixed guide-staples $b$ of the rear axle, so as to be readily raised or lowered thereon.

To both sides of the reach C are hinged symmetrical harrow-sections D, of the usual construction, which are also hung at their outer ends, by suspension-chains $d$, to a cross-beam, A′, of the supporting-frame A. The outer end of each harrow-section is also connected, by a chain, $e$, to a double-crank shaft, $e^1$, which is again connected by a crank-rod, $e^2$, to a hand-lever, $f$, which is placed sidewise of the driver's seat, and guided and retained in any desired position by spring-pawl and rack, or other approved mechanism. Either harrow-section, or both, may thus be readily raised or lowered, as required by the work, according as obstructions on the field have to be avoided, or for turning or passing from place to place.

A smoothing harrow or rake, E, is hinged by fixed arms to the rear part of the supporting-frame A, and raised or lowered, in similar manner as the side harrows, by a chain, bell-crank lever, and connecting crank-rod from a front lever or treadle, arranged centrally in front of the driver's seat, so as to be readily operated either by the hand or foot of the driver. The smoothing harrow or rake E may also be thrown up entirely on frame A when it is not required for use at all.

When the harrow is to be moved from place to place all the sections are raised and retained in raised position, the harrow being then driven, without detaching any one of the working parts, as easily as a wagon.

When arriving on the field, the harrow-sections are lowered and passed over the ground, the entire apparatus being drawn by the horses hitched to a tongue of the front axle.

This harrow construction has the advantage that it does away with the tiresome walking along after the harrow in plowed ground, and that it may be operated with less fatigue and inconvenience.

Every part of the harrow is easily managed from the seat without requiring the driver to get off for adjusting any part thereof.

Having thus described my invention, I claim as new and desire to secure by Letters Patent—

In a harrow, the combination of the wheeled supporting-frame, having a transverse beam and a hinged smoothing harrow or rake at the rear end, with a suspended and vertically-movable center reach, with hinged harrow-sections, that are connected at the outer ends by chains to the cross-beam of the frame, and with lever mechanism for operating the smoothing and side harrows from the driver's seat, substantially as and for the purpose specified.

GEORGE W. ROSS.

Witnesses:
BENNETT M. ROGERS,
C. E. STUMP.